March 4, 1969 W. KITAJ 3,430,627
HYPODERMIC NEEDLE
Filed June 10, 1963
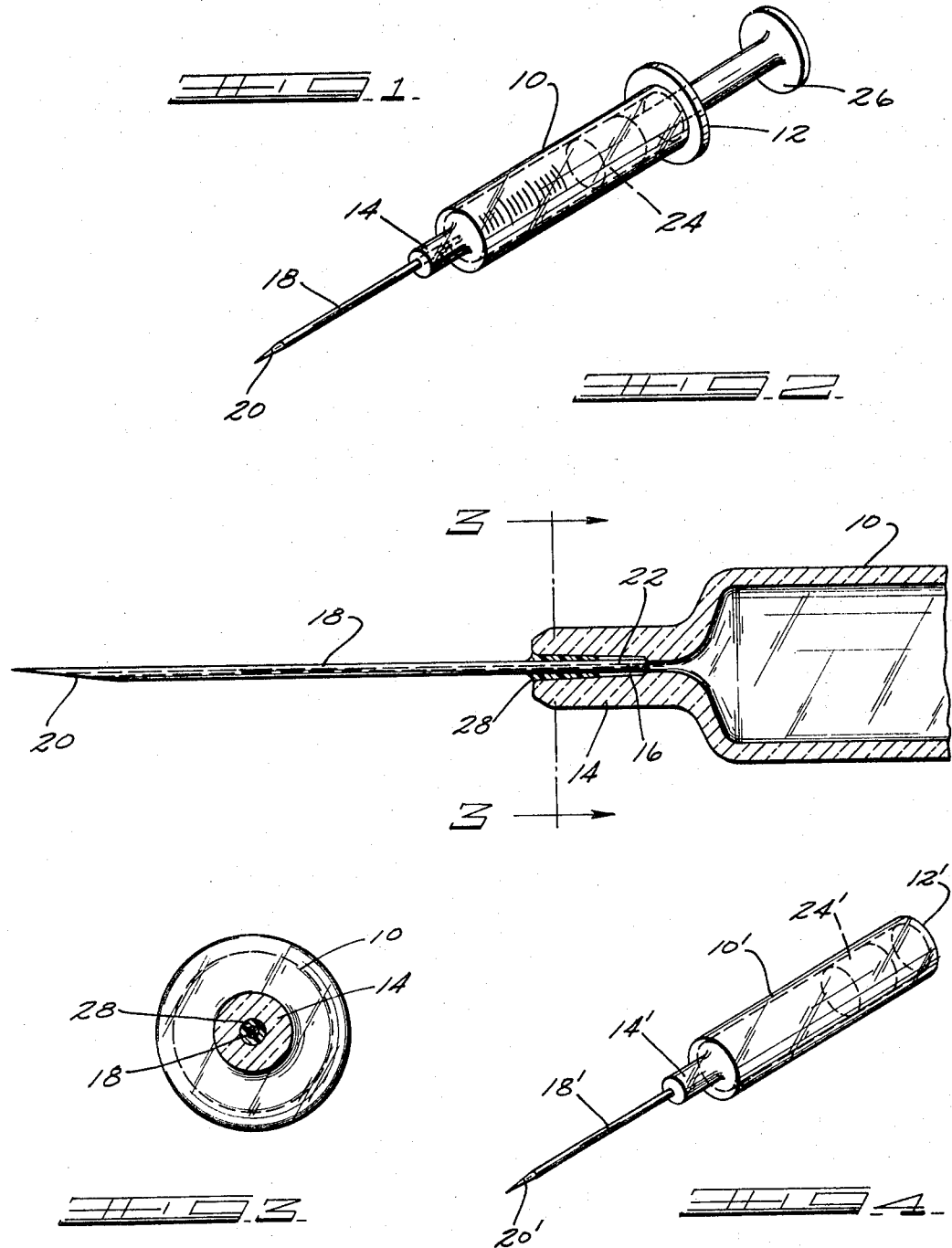
INVENTOR.
WALTER KITAJ
BY W.A. Schaich &
Charles A. Lynch
ATTORNEYS

United States Patent Office 3,430,627
Patented Mar. 4, 1969

3,430,627
HYPODERMIC NEEDLE
Walter Kitaj, Toledo, Ohio, assignor to Owens-Illinois Glass Company, a corporation of Ohio
Filed June 10, 1963, Ser. No. 286,548
U.S. Cl. 128—221
Int. Cl. A61m 5/18; C09j 5/06
16 Claims The present invention relates to a hypodermic needle or syringe assembly which is disposed of after it is used once, and, more particularly, to a method for securely bonding the metal cannula to the inner surface of a glass barrel or hub of the assembly.

Various types of hypodermic needles have been employed in the past for the administration of therapeutic substances by subcutaneous, intramuscular, or intravenous injections. Most of these needles have the common feature of a beveled point at one end of the cannula and the other end being attached to the glass hub or barrel which contains the therapeutic agent.

In most of the commonly employed structures, the cannula is made from stainless steel and the hub is made from glass or plastic. Because of the dissimilarity between the materials forming the components of the hypodermic needle and the differences in their respective coefficients of expansion, difficulties are encountered in achieving a durable bond between the two members. Numerous attempts have been made in the past to remedy this situation by employing different types of adhesive materials. For example, hypodermic needles with glass barrels have had the metal cannula bonded to the glass by softening or melting the glass after the base of the metal cannula has been inserted into the bore, and then cooling the molten or softened glass about the cannula base. These attempts have not met with success because of the difficulty of forming a satisfactory bond between glass and metal. Materials such as beeswax or paraffin have also been employed, but the resulting bond has low tensile strength. Moreover, these substances cannot be used when the hypodermic needle must be sterilized at high temperatures. Direct insertion of the metal cannula into a glass hub, depending on a force fit for bonding strength, has not been successful due to the expense involved in maintaining control of the close tolerances involved. Moreover, this type of connection does not possess sufficient flexibility. Plastic materials have also been used for hubs and the cannula inserted into the plastic which is melted to flow around the cannula to provide the seal. However, most of these plastics cannot withstand sterilization temperatures, and the adhesion has not always been of consistently high quality, since metals and certain plastics do not adhere well together.

One of the recent developments relating to adhesives has been in the field of polyurethane resins. These substances, which are the reaction product of compounds containing a plurality of hydroxy groups with organic polyisocyanates, produce good adhesives. However, when bonding dissimilar materials, it is frequently necessary to employ a primer coat which is applied prior to the polyurethane. Moreover, in conventional applications it is necessary first to prepare a prepolymer which is then dissolved in a solvent and, together with the catalyst, is applied to the particular base. The considerable complexity of these processes has been a disadvantage. The use of volatile solvents as a vehicle for the prepolymer has involved certain dangers and also presents a toxicity and contamination problem in connection with handling pharmaceuticals. Furthermore, the presence of the solvent causes bubbles to form in the seal which weaken the bond between the metal and glass, and increase the danger of leakage and contamination of the pharmaceuticals.

Accordingly, it is one of the objects of the present invention to overcome the disadvantages and shortcomings of the known disposable hypodermic syringes or needles referred to above.

It is another object of this invention to provide a method for quickly and easily forming a hypodermic syringe assembly wherein the steel cannula is securely bonded to the glass syringe and is able to maintain its bond even at sterilization temperatures.

It is a further object of this invention to provide a hypodermic syringe assembly capable of withstanding sterilization temperatures without weakening the bond between the metal and glass surfaces, even though these surfaces have different coefficients of expansion.

It is still another object of this invention to form a hypodermic syringe assembly having a seal between the steel cannula and the glass surface to which the cannula is secured, which seal is bubble-free and flexible enough to withstand the differences in thermal expansion of the members at elevated temperatures, and which seal also is nontoxic and is resistant to leaching by therapeutic agents.

In attaining the above objects of the present invention, one feature resides in the use of a one-shot, solvent-free polyurethane adhesive material for bonding the metal cannula to the barrel or hub of a hypodermic needle.

Another feature of the present invention resides in the use of a particular combination of adhesive materials which completely eliminates the presence of toxic chemicals that can be leached out into the therapeutic agent contained in the syringe.

Other features and objects of this invention will become apparent from the following description thereof taken in conjunction with the accompanying drawing, wherein:

FIG. 1 is a perspective view of an embodiment of the hypodermic syringe assembly of the present invention;

FIG. 2 is an enlarged sectional plan view of a portion of the hypodermic syringe assembly of the present invention;

FIG. 3 is a cross-sectional view taken along lines 3—3 of FIG. 2; and

FIG. 4 is a perspective view of another embodiment of the hypodermic syringe assembly of the present invention.

It has now been discovered that the metal cannula can be efficiently bonded to the barrel or hub of a glass hypodermic syringe by a one-shot polyurethane composition. The resulting adhesive bond is thermally stable, flexible, and is free from toxic chemicals that can leach out into the solution. Moreover, by employing a one-shot system of the present invention, the necessity of using a primer composition containing a prepolymer and volatile solvents is eliminated.

The hypodermic syringe assembly that is employed for purposes of the present invention can be any one of several conventional types. For example, the one that is found to be most commonly employed, and which is illustrated in FIG. 1, comprises a glass syringe 10 having an open end 12 and provided with a tapered hub 14 at the opposite end, which hub defines an opening or bore 16 communicating with the interior of the syringe 10. The hollow metal cannula 18, which is normally cylindrical, is provided with a sharp beveled point 20 at one end, and the opposite end 22 is inserted into the bore 16 of the hub 14. The syringe 10, when filled with a therapeutic agent (not shown), is sealed with a member 24 slidable within the syringe and acting as a piston to force the therapeutic agent to pass through the cannula 18. Plunger 26 is suitable for forcing piston 24 downwardly into the syringe 10. The cannula 18 is bonded in bore 16 by the adhesive composition 28 of the present invention.

The hypodermic syringe of the invention is assembled and sterilized prior to being filled with the pharmaceutical agent. Thus, the syringe manufacturer may proceed to assemble the syringe and cannula, using the composition of the invention and, after subjecting the assembly to a sterilization temperature for the necessary amount of time, ship the sterilized assemblies to the pharmaceutical manufacturer who need only fill the syringes and insert the suitable seal or piston 24 therein. As is customary, the cannula is covered prior to sterilization by a suitable needle point cover such as that disclosed in U.S. Patent 2,831,483, which cover is removed just prior to use of the hypodermic syringe.

In the embodiment illustrated in FIG. 4, the syringe 10′ and cannula 18′ is adapted for insertion into a hypodermic "gun" having means for moving the piston 24′ downwardly into the syringe to force the therapeutic agent (not shown) through the cannula 18′.

The adhesive composition which gives the desired results of this invention is a mixture of a particular polyol, an organic polyisocyanate, and a catalyst. The polyol is a branched polyol of an average molecular weight of about 400 to about 700 AMU having from 300 to 400 hydroxy groups per 100 molecular weight units, and which is formed by reaction of a compound having at least three hydroxyl groups per molecule and which contains only carbon, hydrogen and oxygen atoms such as the alcohols, or only carbon, hydrogen, oxygen and nitrogen atoms such as triethanolamine, with at least two molar equivalents of an alkylene oxide such as ethylene oxide, propylene oxide, or butylene oxide and mixtures thereof. Preferred polyols include those which are prepared by a Tollen's condensation reaction between a monofunctional, aliphatic aldehyde or ketone of from 2 to 10 carbon atoms, which contains at least one active hydrogen atom, with at least $(N+1)$ molar equivalents of formaldehyde, where N is the number of active hydrogen atoms per molecule of carbonyl compound, followed by a condensation of the resultant alcohol with ethylene oxide or propylene oxide, or both, to give a polyol with a molecular weight of from 400 to 700 AMU. Specific examples of polyols are the condensation reaction product of pentaerythritol and propylene oxide, condensation product of ethylene diamine and propylene oxide, alkylene diamine-epoxide resins, trimethylol propane, and the like. Mixtures of polyols may also be employed.

Among the organic polyisocyanates which may be employed for the purposes of the present invention are any aliphatic, aromatic, or cycloaliphatic polyisocyanates, such as toluene diisocyanate, polymethylene diisocyanates, and aromatic diisocyanates such as p,p′-diisocyanatodiphenyl methane.

The adhesive composition of the present invention also contains a catalyst which may be any basic organic nitrogen compound containing an active hydrogen atom, as determined by the Zerewitinov method. The active hydrogen atom allows incorporation of the catalyst in the polymer by condensation with an isocyanate group. This prevents the catalyst from being leached out by the therapeutic agents which may later contact the seal and avoids contamination of the contents. Examples of basic organic nitrogen compounds which can be employed as the catalyst in the polyurethane adhesive composition are triethanolamine, dimethylethanolamine, ethylcyclohexylamine, and the like.

In preparing the adhesive composition, generally 15 parts by weight of the polyol, from about 0.4 to about 1.0 part of the catalyst, and from about 8.5 to about 16 parts of the organic isocyanate are mixed together. The cannula is then inserted within the hub of the syringe and the adhesive material is applied in an amount sufficient to fill the space between cannula and the inner wall of the hub, but spaced a short distance from the end of the cannula to avoid covering and clogging the bore of cannula. Alternatively, the adhesive composition may be applied to the cannula in an annular band a short distance from the end so as to avoid clogging the opening of the cannula when it is inserted into the bore of the syringe. The adhesive composition is then cured, preferably by heating to a temperature of about 180° C. for a period of about 10 to 15 minutes in order to provide the satisfactory seal between steel cannula and the hub.

The following examples serve to illustrate the present invention, but are not to be considered limiting the scope thereof in any manner.

*Example I*

An adhesive material of the following composition was employed to seal a steel cannula in the bore of a glass hub, all proportions being in parts by weight:

| | Parts |
|---|---|
| Pentaerythritol-propylene oxide polyol having a molecular weight of 650 | 15 |
| Triethanolamine | 6 |
| Toluene diisocyanate | 9.6 |

The ingredients were mixed shortly before application to the space between the end of the cannula and the hub, and the hypodermic syringe was subsjected to a temperature of 180° C. for ten minutes to permit curing of the sealing material.

*Example II*

An adhesive material of the following composition was employed to seal a stainless steel cannula in the bore of a glass syringe, all proportions being in parts by weight:

| | Parts |
|---|---|
| Pentaerythritol-propylene oxide polyol having a molecular weight of 600 | 12.5 |
| Trimethylolpropane-propylene oxide polyol having a molecular weight of 730 | 2.5 |
| Triethanolamine | 0.6 |
| Toluene diisocyanate | 9.4 |

The average hydroxyl number of the polyol mixture was 350. The ingredients were mixed shortly before application to the space between the end of the cannula and the hub in the bore and the hypodermic syringe was subjected to a temperature of 180° C. for about 10 minutes to permit curing of the sealing composition. In the tensile test for the strength of the bond, the bond was found to support a maximum load of 81 pounds.

Hypodermic needles prepared in accordance with the present invention passed all the requirements established by the pharmaceutical industry for needles of this type. The seals which were formed were bubble-free, and no leaching of the ingredients of the seal into the contents of the syringe occurred. Even though the hypodermic needles were subjected to elevated temperatures to sterilize the components, the seal was in no way adversely affected.

The adhesive compositions of the present invention eliminate the necessity for employing a primer composition and the necessity for a prepolymer-solvent system for application to metal and glass surfaces. The bond which is formed between the cannula and the glass syringe has an average strength of 79 lbs., which is equal to the bond of an epoxy cement. Thus, glass failure will occur before any break in the sealant material.

What is claimed is:

1. A hypodermic syringe comprising a glass barrel having a bore at one end thereof, a steel cannula having one end located within said bore and communicating with the interior of said barrel and a seal disposed within the space between said cannula and said barrel and bonding said cannula to said barrel within said bore, said seal being the reaction product of a composition consisting essentially of a branched polyol having a molecular weight of about 400 to 700, an organic polyisocyanate and a curing agent consisting of an organic nitrogen-containing compound having at least one active hydrogen atom per molecule, said curing agent being present in an amount to react completely with the available isocyanate groups.

2. A hypodermic syringe comprising a glass barrel, having a bore at one end thereof, a steel cannula having one end located within said bore and communicating with the interior of said glass barrel and a seal bonding said cannula to said barrel within said bore, said seal being the reaction product of a composition consisting essentially of 15 parts of a branched polyol having a molecular weight of about 400 to 700, from 8.5 to 16 parts of an organic polyisocyanate, and from about 1.0 to 0.4 part of a tertiary amine curing agent having at least one active hydrogen atom, per molecule, said parts being by weight.

3. The hypodermic syringe as defined in claim 2 wherein said branched polyol has from 300 to 400 hydroxyl groups per 100 molecular weight units.

4. The hypodermic syringe as defined in claim 2 wherein said branched polyol is the condensation product of
    (a) an alkylene oxide selected from the group consisting of ethylene oxide, propylene oxide, butylene oxide and mixtures thereof and,
    (b) an alcohol.

5. The hypodermic syringe as defined in claim 4 wherein said alcohol is formed by a Tollen's condensation between
    (a) a monofunctional, aliphatic member selected from the group consisting of aldehydes and ketones, said member having from 2 to 10 carbon atoms and containing at least one active hydrogen atom, and
    (b) at least $(N+1)$ molar equivalents of formaldehyde, wherein N is the number of active hydrogen atoms per molecule of carbonyl compound.

6. The hypodermic syringe as defined in claim 2 wherein said branched polyol is the reaction product of pentaerythritol and propylene oxide.

7. The hypodermic syringe as defined in claim 2 wherein said branched polyol is the condensation product of ethylenediamine and propylene oxide.

8. The hypodermic syringe as defined in claim 2 wherein said curing agent is a member selected from the group consisting of triethanolamine, dimethylethanolamine and ethylcyclohexyl amine.

9. The hypodermic syringe as defined in claim 3 wherein said curing agent is a member selected from the group consisting of triethanolamine, dimethylethanolamine and ethylcyclohexyl amine.

10. The hypodermic syringe as defined in claim 4 wherein said curing agent is a member selected from the group consisting of triethanolamine, dimethylethanolamine and ethylcyclohexyl amine.

11. The hypodermic syringe as defined in claim 6 wherein said curing agent is a member selected from the group consisting of triethanolamine, dimethylethanolamine and ethylcyclohexyl amine.

12. The hypodermic syringe as defined in claim 7 wherein said curing agent is a member selected from the group consisting of triethanolamine, dimethylethanolamine and ethylcyclohexyl amine.

13. A hypodermic syringe as defined in claim 2 wherein said polyol is the reaction product of pentaerythritol and propylene oxide and said curing agent is triethanolamine.

14. The hypodermic syringe as defined in claim 2 wherein said branched polyol is the reaction product of
    (a) a compound having at least three hydroxyl groups per molecule and selected from the group consisting of
        (1) compounds containing only carbon, hydrogen and oxygen atoms, and
        (2) compounds containing only carbon, hydrogen, oxygen and nitrogen atoms, with at least two molar equivalents of
    (b) an alkylene oxide selected from the group consisting of ethylene oxide, propylene oxide, butylene oxide, and mixtures thereof.

15. A method of making a heat sterilizable hypodermic syringe assembly comprising a glass barrel and a metal cannula, which comprises inserting a metal cannula into a constricted narrow passage at the delivery end of a glass barrel, an adhesive composition being in contact with said metal cannula and said narrow passage of the glass barrel, said composition consisting essentially of a branched polyol having a molecular weight of about 400 to 700, an organic polyisocyanate and a curing agent consisting of an organic nitrogen containing compound having at least one reactive hydrogen group per molecule and thereafter heating to cure the adhesive composition, said curing agent being present in an amount to react completely with the available isocyanate groups whereby the reaction product thereof provides a safe and effective bond between the metal cannula and the glass barrel.

16. A method for making a heat sterilizable hypodermic syringe assembly comprising a glass barrel and a metal cannula, which comprises inserting said metal cannula into a constricted narrow passage at the delivery end of of the glass barrel, an adhesive composition being in contact with said metal cannula and said narrow passage of the glass barrel, said composition consisting essentially of, in parts by weight, 15 parts of a branched polyol having a molecular weight of about 400 to 700, from 8.5 to 16 parts of an organic polyisocyanate and from about 1.5 to 0.4 parts of a tertiary amine curing agent having at least one active hydrogen atom per molecule, and thereafter heating to cure the adhesive composition whereby the reaction product thereof provides a safe and effective bond between the metal cannula and glass barrel.

References Cited

UNITED STATES PATENTS

| | | | |
|---|---|---|---|
| 3,096,763 | 7/1963 | McConnaughey et al. | 128—221 |
| 3,186,408 | 6/1965 | Jacob | 128—221 |
| 3,247,850 | 4/1966 | Gettig et al. | 128—221 |

OTHER REFERENCES

Gaylord, Norman G.: "Polyethers, Part I, Polyalkylene Oxides and Other Polyethers," Interscience Publishers, New York, 1963, pp. 230 and 398–400.

ROBERT PESHOCK, *Primary Examiner.*